May 6, 1941.  C. ELLIS  2,240,558

NITRATED DIESEL FUEL AND PROCESS OF MAKING SAME

Filed Feb. 7, 1936  4 Sheets-Sheet 1

Fig.-1

Carleton Ellis Inventor
By P. L. Young Attorney

May 6, 1941.   C. ELLIS   2,240,558
NITRATED DIESEL FUEL AND PROCESS OF MAKING SAME
Filed Feb. 7, 1936   4 Sheets-Sheet 2

Fig. 2

Carleton Ellis Inventor
By P. H. Young Attorney

Patented May 6, 1941

2,240,558

UNITED STATES PATENT OFFICE 2,240,558

NITRATED DIESEL FUEL AND PROCESS OF MAKING SAME

Carleton Ellis, Montclair, N. J., assignor to Standard Oil Development Company, a corporation of Delaware Application February 7, 1936, Serial No. 62,759

1 Claim. (Cl. 44—9)

This invention relates to fuels for Diesel engines and is concerned particularly with petroleum fuels adapted to ignite at relatively lower temperatures under compression.

The widespread use of engines of the Diesel type has been retarded to some extent by the high compression required to secure adequate ignition speed. This requirement, reflected in the inordinate strength of materials demanded in engine construction, has resulted in a very cumbersome engine design which has limited the field of application of the Diesel engine.

Owing to the very low fire hazard involved in Diesel engine operation due to the fuel employed, great effort has been made to utilize this type of engine in the aviation field. To gain strength without greatly adding to the weight per horse power over the present forms of gasoline-burning aviation engines, resort has been had to costly alloy steels and the like, thereby raising the cost of engine construction per horse power to many times that of the gasoline engine.

To assist in the reduction in Diesel engine weight proposals have been made to add to the fuel a "dope" of the nitric ester type which would accelerate ignition. For example, the addition of several per cent of ethyl nitrite or nitrate has been recommended. Effective dopes of this nitro type are costly and although initial expense of engine plant may be reduced the expense of operation is increased in considerable measure. Furthermore such dopes generally possess a flash point considerably lower than that exhibited by normal Diesel fuels, and when added in appreciable proportions usually effect a substantial reduction in the flash point of the Diesel fuel, thereby increasing the fire hazard associated with the handling and use of such fuels. Other dopes of the nitro type which have been suggested are, for example, nitrobenzene, nitrotoluene, or picric acid (trinitrophenol). All such dopes are obtained from extraneous sources, that is, from hydrocarbons not inherently present in this class of fuels obtained from petroleum.

The present invention involves the treatment of petroleum and related fuels cheaply to confer thereon the quality of lower ignition temperatures without the necessity of adding ignition temperature depressants, or dopes, made extraneously. It is applicable particularly to non-volatile petroleum fuels of the Diesel type, that is, fuels which unlike ordinary gasoline do not spontaneously evaporate when exposed to the atmosphere and which present a very low fire hazard because of their much higher fire and flash points. Furthermore, this lowering of ignition temperature is accompanied by an increase in the cetane value of the fuel, that is, when employed in a Diesel engine the fuel exhibits a higher, or increased, antiknock value.

One procedure whereby I confer on the fuel the quality of lower ignition temperature is by treating such fuel with nitric acid. Nitration may be carried out at room temperature or at higher or lower temperatures. Other nitrating agents which I may employ are mixtures of concentrated sulphuric and nitric acids, sulphuric acid and sodium nitrate, or the oxides of nitrogen. The latter (i. e., oxides of nitrogen) may be prepared by the action of sulphuric acid on sodium or potassium nitrite, by the action of nitric acid on copper, by the passage of air (i. e., a gas containing both oxygen and nitrogen) through an electric arc, by the catalytic oxidation of ammonia, or by any other convenient method. Preferably a small proportion of air, or other oxygen-containing gas, is mixed with the oxides of nitrogen before passing into the oil. With some types of Diesel fuel liquid oxides of nitrogen, instead of the gaseous oxides, may be employed as the nitrating agents.

Although concentrated nitric acid or mixtures of concentrated nitric and sulphuric acids or of concentrated sulphuric acid and sodium nitrate may be employed, preferably I dilute such nitrating agents with water until the concentration of the reactive agent, or agents, is that represented approximately by the sludge-minimum point, i. e., the concentration of the nitrating agent at which substantially no sludge or only the minimum quantity is formed during the nitration step and simultaneously nitration of the oil proceeds to a degree sufficient to yield a fuel of lower ignition temperature (as determined by the hot plate method). It is also desirable that the concentration of the nitrating agent be such that substantially no oxidation of the hydrocarbon constituent of the fuel to acidic bodies occurs.

Instead of using commercial sulphuric acid I may employ the acid recovered from the sludge produced in the sulphuric acid refining of petroleum, or other related hydrocarbon, distillates. Recovery of acid from such sludge can be accomplished by diluting the latter, for example, with one or two volumes of water and removing the insoluble portion which separates on dilution. In some instances, e. g., when the proportion of water-insoluble material is small or when such material exerts no deleterious effect on the fuel being treated, dilution of the sludge with water, prior to use, can be omitted.

It is desirable in the nitrating operation that vigorous oxidation, or other objectionable reaction, resulting in the formation of sludge be avoided in so far as possible. As previously mentioned, the concentration of the nitrating mixture preferably should be at the sludge-minimum point. For this reason, the proportion of nitrating agent and the temperature of nitration will vary with different fuels, although generally the more dilute the acid employed the higher the temperature at which nitration is effected. The exact strength of the nitrating agent and the temperature required for any individual fuel will therefore vary with the degree of unsaturation and other chemical characteristics of the oil. With some oils intended for Diesel fuel it may be necessary to treat first with a small proportion of concentrated surphuric acid, and afterwards subject the treated oil to the action of the nitrating mixture. In the preferred method, however, I omit this preliminary treatment with sulphuric acid. Furthermore, since nitro compounds, as a rule, exhibit a specific gravity greater than the corresponding hydrocarbons and in the preferred method of operation little or no sludge is formed, the increase in specific gravity of the treated fuel may be taken as a qualitative indication of the degree of nitration attained.

Mild nitration of Diesel fuel often results in very little change occurring in the specific gravity or flash and fire points of the oil, but with increasing nitration both the fire and flash points as well as the specific gravity of the fuel become higher. At the same time the temperature at which ignition of the fuel takes place is greatly decreased. This lowering of ignition temperature accompanied by a decrease in fire hazard (i. e., increase in flash and fire points) brought about by nitration of the fuel is a surprising and unusual combination of properties which I regard as being particularly advantageous in the use of heavy non-volatile fuels of the Diesel type. Another advantage of nitration is the marked improvement in odor of many fuels, more especially those fuels containing mercaptans and other compounds possessing disagreeable odors.

The accompanying drawings or graphs indicate an increase of specific gravity with increase in degree of nitration; also certain changes in flash and fire points and ignition temperatures as nitration progresses and the effect of addition of extraneous nitro compounds on flash and fire points. In the drawings Fig. 1 serves to illustrate the increase in flash and fire points of a Diesel fuel with increasing degree of nitration as indicated by the specific gravity of the product.

In some instances it may be advantageous to employ catalysts in the nitrating step. One example of such a catalyst is aluminum nitrate. In other instances it is found that a mixture of nitrating agents effects desirable reaction much more rapidly than a single agent. As an illustration, under the same conditions of treating, an aqueous solution of sulphuric acid and sodium nitrate usually will furnish the same degree of nitration of some oils in considerably less time than an aqueous solution of nitric acid, the concentration of the latter being equal to that formed by the expected interaction of sulphuric acid and sodium nitrate in the first case.

One procedure for treating Diesel fuels consists in mixing the oil and nitric acid (or nitrating mixture), the temperature being maintained, for example, by heating or cooling coils, as the case may be, and agitating the mixture until the desired degree of nitration is attained. The mixture then is allowed to settle and the acid and oil layers separated. The oil is washed with water or other washing and/or neutralizing medium to remove free acid and, if necessary, is filtered through an inert material, e. g., fine sand, to eliminate small dispersed particles of sludge. Modifications of this procedure are the addition of the nitrating agent in two or more portions to the oil or of the oil in two or more portions to the nitrating agent. Other modifications can be secured by varying the temperature. Thus, a portion of the nitrating agent can be added and the temperature of treating kept at, say, 0° C. After the more reactive constituents of the oil have become nitrated, more of the agent is added and the temperature increased to, say, 60° C. Or, partial nitration may be effected by employing dilute nitric acid, e. g., sp. gr. 1.05, followed by treatment with more concentrated acid, e. g., sp. gr. 1.10. Many other modified procedures involving the temperature of reaction, strength of nitric acid or other nitrating agent, and the stepwise addition of nitrating agent or of oil, are possible as will be evident.

Although the pour points of fuels of the Diesel type are generally very low, e. g., about −40° C. (−40° F.), nevertheless nitration of the fuel is often accompanied by an increase in the pour point of the oil. In the preferred method, nitration of the fuel results in only a small increase in temperature at which the oil will pour, thereby yielding a fuel which is readily flowable even at relatively low temperatures. In those cases where the pour point of the nitrated oil has been increased to an inordinate degree, the product may be treated to remove the objectionable thickening bodies to the extent necessary or required.

In some instances nitrated Diesel fuels or blends of nitrated and non-nitrated fuels will deposit a very small proportion of sediment, or sludge, during storage. The presence of insoluble material, even in minute quantity, is highly undesirable in Diesel fuels as the accumulation of such deposits in the fuel jets quickly results in their becoming more or less closed, thus resulting in reduction of the fuel supply to the engine. In cases when the fuel is used at not too great an interval after being prepared, incorporation of an oxidation inhibitor, of which α-naphthol is an example, may retard sludge-formation sufficiently to permit the fuel being employed without any ill effects on the engine. In still other cases it may be necessary to age the fuel, i. e., keep it stored, until deposition is substantially complete. This aging may be done at atmospheric temperature, or at somewhat elevated temperatures, e. g., 90° C. Either the nitrated fuel may be aged, the resulting sludge removed by filtration or other means, and the aged fuel blended with a non-nitrated fuel, or the blended fuel may be aged and any precipitated material separated from the main body of the oil.

Some nitrated Diesel fuels may contain a small proportion of bodies which exert a corrosive action on some metal surfaces, as for example, the fuel tank, jets, or other parts of the Diesel engine. One procedure whereby such action may be inhibited is the addition of a small proportion of an antacid, e. g., aniline, triethanolamine or gaseous ammonia. Another method of reducing corrosion consists in subjecting the nitrated fuel to a mild reduction by hydrogen or other reducing agents. Furthermore, corrosion of metals by nitrated Diesel fuel can be minimized by avoiding exposure of the fuel to moisture or to sunlight.

It has been noted that some petroleum distillates, intended for use as Diesel fuels, contain a small proportion of bodies presumably of the phenolic type. Phenolic compounds, as a rule, are easily nitrated yielding products which are strongly acidic in character and which readily corrode metals. The presence of phenolic bodies in Diesel fuels which are to be nitrated is, therefore, highly undesirable. Removal of such substances from petroleum fractions may be accomplished, for example, by washing the distillate with an aqueous alkaline solution or by treatment with solid alkali, e. g., sodium hydroxide. Such treatment prior to nitration not only yields a nitrated Diesel fuel of greatly reduced corrosive action, but also decreases the proportion of sludge formed during the nitrating operation.

As stated in Serial No. 670,753, nitrated fuels may be used alone or, if desired, may be blended with non-nitrated fuels such as normal Diesel oils or hydrogenated oils including those which have been made by hydroforming (hydrogenolysis) and milder treatments of the hydrofining type. For example, blends in some cases may be constituted of equal volumes of a nitrated and a non-nitrated oil. In other cases one-fourth part or less of the nitrated or non-nitrated oil may be present, and the remaining three-fourths part or more being composed of the other constituent, or other proportions used.

I may also lower the temperature of ignition of normal Diesel fuel by incorporating substantially at the time of use a desired proportion of nitrated fuel or of substances capable of causing such lowering. One way of accomplishing this regulation and adjustment is the use of two fuel tanks, one of which holds the nitrated fuel (activating liquid) or other ignition temperature depressant and the other holds the Diesel oil normally required. Streams of liquids from both tanks pass through a mixing chamber before introduction into the engine. By regulating the flow of the activating liquid a greater or lesser lowering of ignition temperature may be secured. Such an initiation of activated combustion in desired degree is of advantage, for example, in starting a cold engine at which time a greater proportion of the activating liquid can be used. After the engine has reached normal running temperature, the proportion of activating liquid may be decreased or entirely eliminated. Another application of this method of controlled ignition temperature lowering concerns the operation of airplane engines, particularly as the latter are exposed to wide variations in atmospheric pressure and temperature.

In some cases I may add to the non-nitrated Diesel fuel an auxiliary primer made by nitrating non-volatile petroleum oils or fractions which possess boiling ranges of approximately the same or higher than Diesel fuels. Examples of such oils are the white oils obtained by the drastic treatment of gas oil, or higher-boiling distillates, with sulphuric acid. In other cases I may employ, as the material to be nitrated, such semi-solid or solid petroleum fractions as petrolatum, vaseline, sweater-oil, or paraffin wax. These liquid, semi-solid, or solid petroleum fractions can be nitrated by any of the previously-mentioned procedures and the resulting product, consisting for the most part of nitrated and non-nitrated petroleum hydrocarbons, added to the Diesel fuel in ignition-temperature-lowering proportions.

Addition of nitrated semi-solid or solid petroleum fractions, because of the presence of non-nitrated hydrocarbons, may result in some instances in an undesirable increase in the pour point of the Diesel fuel. Thus Diesel fuel containing dissolved nitrated paraffin wax, for example, when subjected to a lowering of temperature, e. g., when exposed to cold weather, may become sufficiently viscous and cease to flow readily or, if the temperature lowering is sufficiently great, may even become solid and non-flowable. Such physical changes in the oil would result in a partial or complete plugging of the fuel lines from the feed tank to engine or to the fuel jets, thereby resulting in faulty performance or stalling of the engine. To overcome this difficulty I may, e. g., extract the nitrated semi-solid or solid petroleum fractions with a selective solvent, thereby effecting a separation of nitrated and non-nitrated petroleum hydrocarbons.

Examples of selective solvents which I employ for this purpose are acetone, methyl and ethyl alcohols, and ethylene dichloride. Extraction may be carried out at atmospheric temperature or at lower temperatures, the latter being particularly advantageous as the solubility of the non-nitrated petroleum hydrocarbons is greatly reduced thereby. After extraction is complete, undissolved non-nitrated petroleum hydrocarbons are separated from the solution of nitrated petroleum hydrocarbons. The solution may then be subjected to evaporation, distillation, or any other convenient operation whereby the solvent is removed from the nitrated hydrocarbons. In this manner I obtain a concentrate of nitrated petroleum hydrocarbon ignition temperature depressants which may be added to Diesel fuels in proportions sufficient to secure the desired ignition temperature lowering. The non-nitrated portion can again be subjected to nitration and solvent extraction whereby an additional concentrate of nitrated petroleum hydrocarbons is obtained.

In some instances it may be desirable to extract nitrated Diesel fuel with a selective solvent thereby obtaining a concentrate of ignition-temperature depressants. An example of a selective solvent which I have found suitable for this purpose is aniline as it is soluble only to a limited degree in the fuel at atmospheric, or a lower, temperature. After extraction of the nitrated oil, the aniline solution of ignition temperature depressants is treated, e.g., with an aqueous solution of a mineral acid whereby the aniline is dissolved leaving an insoluble concentrate of ignition temperature depressants. The extracted fuel may be washed with dilute acid, to remove any dissolved aniline, and again nitrated and extracted to yield an additional concentrate of ignition temperature depressants.

Extraneous nitrated ignition temperature depressants which are particularly suitable for my purpose are those obtained by the nitration of polymerized isobutylene, preferably the trimeric or higher polymeric isobutylenes, or mixtures of these polymeric hydrocarbons. Such polymers, or mixtures thereof, exhibit boiling ranges comparable to those of petroleum oils normally suitable for Diesel engine operation. Isobutylene (which boils at —6° C.) occurs to the extent of about 4 per cent by weight, or more, in the gases obtained by cracking petroleum distillates, e.g., gas oil or heavier fractions. It may be separated from associated gaseous hydrocarbons by liquefaction of the mixture followed by fractional distillation, or by any other convenient method. Polymerization of isobutylene to the dimeric, trimeric, or higher polymers is accomplished with the aid of catalysts such as boron trifluoride, dilute sulphuric acid (e. g. 65–70 per cent acid), or aluminum chloride. Unchanged isobutylene and diisobutylene can be separated from the polymerization product by distillation leaving a residue of triisobutylene and higher polymers. Treatment of these residual polmyers with nitric acid, sodium nitrate and sulphuric acid sludge, oxides of nitrogen, or other nitrating agents furnishes nitrated hydrocarbons which may be added to nitrated or non-nitrated Diesel fuels as ignition temperature depressants. Alternatively, the isobutylene polymers can be blended with untreated Diesel fuel and the blended fuel subjected to the action of nitrating agents.

Although I prefer to exclude addition of costly dopes, such as ethyl nitrate or nitropropane, I do not wish to imply that addition of nitrated compounds, obtained by the treatment of extraneous hydrocarbons, may not be made. Preferably I employ those nitrated compounds, the addition of which do not increase the fire-hazard of the fuel by unduly lowering its flash point. An example of such a compound is 2-methyl-2-nitropropane-1,3-dinitrate. This compound is obtained by nitrating 2-methyl-2-nitro-1,-3-propanediol which in turn is made by the action of formaldehyde on nitroethane. The formation of the dinitrate may be represented in the following manner:

Analogous nitrodihydroxy alcohols, which in turn may be converted to the corresponding dinitrates, are obtained by the substitution of acetaldehyde for formaldehyde. Although I may add such nitrated ignition temperature depressants, e.g., 2-methyl-2-nitropropane-1,3-dinitrate, made from extraneous sources to normal Diesel fuels, preferably such ignition temperature depressants, or primers, are incorporated as auxiliary primers with nitrated Diesel fuels or with blended fuels one constituent of which is nitrated Diesel fuel. An example of the latter is a blended fuel, comprising one-fourth part by volume of nitrated Diesel fuel and three-fourths part by volume of suitable hydrogenated oil, to which is added 1 per cent by volume of 2-methyl-2-nitropropane-1,3-dinitrate.

The following examples will illustrate my invention.

*Example 1.*—One hundred parts of Diesel fuel are agitated with 1 volume of concentrated sulphuric acid. The mixture is allowed to settle and the acid layer withdrawn. One hundred volumes of the acid-treated fuel are nitrated by agitating for 30 minutes with 2.5 volumes of a nitrating mixture consisting of equal volumes of concentrated sulphuric and nitric acids. The acid layer is withdrawn and the nitrated fuel washed with water or neutralizing agents to remove free acids.

*Example 2.*—The following series of results shows the effect on sludge formation, specific gravity, and behavior of fuel when dropped on a hot plate, when low-grade Diesel fuel is treated with nitric acid of different concentrations and at different temperatures. The time of nitration treatment varied from 4 to 5 hours.

| Run No. | Vol. of fuel | Vol. of acid | Sp gr of acid | Temp. | Percent sludge | Sp. gr. of product | Hot-plate behavior |
|---|---|---|---|---|---|---|---|
| | | | | °C. | | | |
| Untreated fuel | | | | | | 0.927 | Did not ignite. |
| 1 | 300 | 50 | 1.09 | 100 | 1-2 | 0.932 | Do. |
| 2 | 750 | 600 | 1.09 | 100 | 1-2 | 0.938 | Ignites. |
| 3 | 250 | 50 | 1.09 | 70 | 1 | 0.942 | Do. |
| 4 | 600 | 600 | 1.14 | 100 | 25 | 0.950 | Do. |

The above data indicate that nitration of the fuel is accompanied by an increase in specific gravity. With this particular fuel, when the specific gravity reached a value of 0.938, hot-plate ignition readily took place. Furthermore, by regulating the quantity of acid employed, its concentration, and the temperature, nitration can be effected with formation of very little sludge.

*Example 3.*—The approximate minimum ignition points (as determined by dropping the fuel on a hot plate) of the products obtained in Example 2 are given in the following table:

| Product | Sp. gr. | Approx. minimum ignition temperature |
|---|---|---|
| | | °C. |
| Untreated fuel | 0.927 | >550 |
| Run 1 | 0.932 | >550 |
| Run 2 | 0.938 | 500 |
| Run 3 | 0.942 | 500 |
| Run 4 | 0.950 | 430 |

Figure 4:
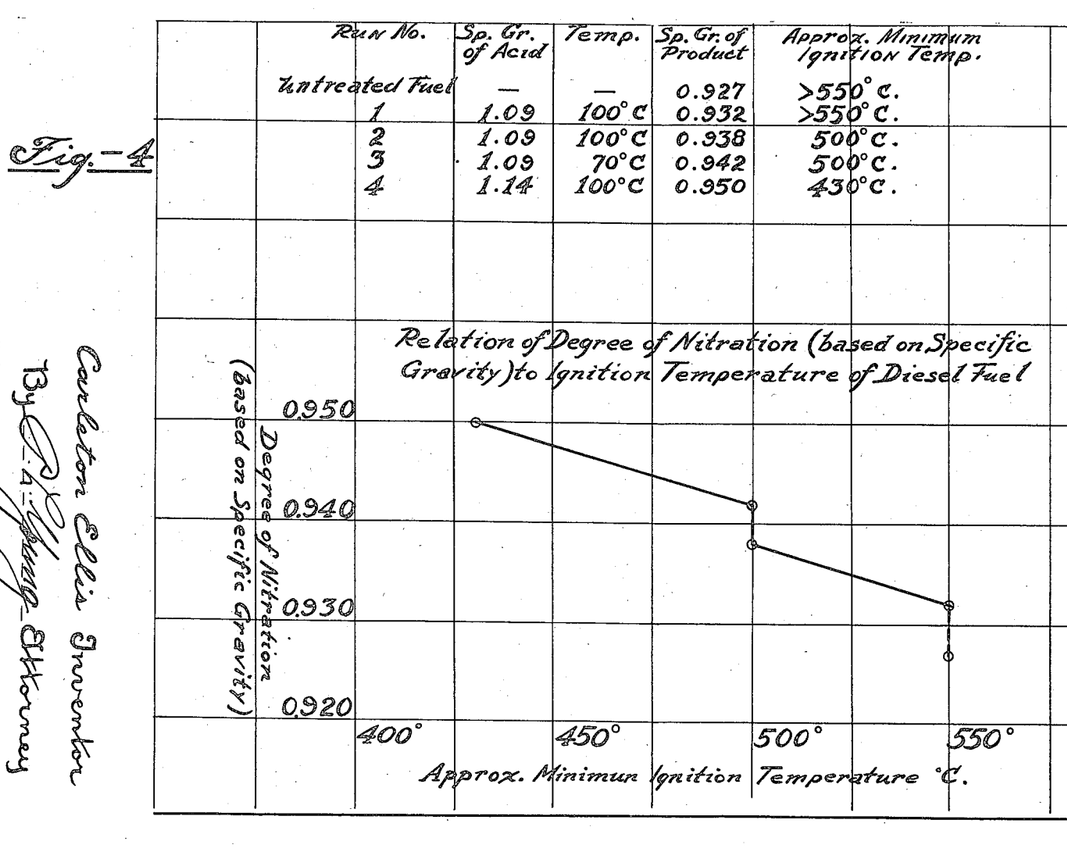
Fig. 4 indicates the decrease in ignition temperature of the fuel (as determined by the hot plate method) with increase in specific gravity due to nitration. References to these drawings will be made in various places throughout the specification.

Referring to Fig. 4, in which is plotted ignition temperature against specific gravity, it is noted that as the specific gravity increases, due to nitration of the fuel, the ignition temperature of the oil is substantially decreased.

*Example 4.*—The results tabulated below were obtained with Colombian Diesel fuel.

| Run No. | Vol. of fuel | Vol. of acid | Sp. gr. of acid | Temp. | Time | Percent sludge | Sp. gr. of product |
|---|---|---|---|---|---|---|---|
| | | | | °C. | Hours | | |
| Untreated fuel | | | | | | | 0.847 |
| 5 | 250 | 25 | 1.09 | 70 | 8 | 1 | 0.863 |
| 6 | 250 | 50 | 1.09 | 50 | 7 | 1 | 0.854 |
| 7 | 250 | 50 | 1.09 | 70 | 4 | 1 | 0.855 |
| 8 | 250 | 50 | 1.09 | 70 | 12 | 1 | 0.880 |

Only the product, obtained in Run 8, which had a specific gravity of 0.880 ignited readily when dropped onto a hot plate.

*Example 5.*—The approximate ignition points and the flash and fire points of the products obtained in Example 4 are given below.

| Product | Specific gravity | Flash point | Fire point | Approximate minimum ignition temperature |
|---|---|---|---|---|
| | | °F. | °F. | °C. |
| Untreated fuel | 0.847 | 161 | 180 | >500 |
| Fuel heated for 8 hours at 70° C. | .850 | 169 | 196 | >500 |
| Run 5 | .863 | 208 | 221 | >500 |
| Run 6 | .854 | 180 | 212 | >500 |
| Run 7 | .855 | 176 | 192 | >500 |
| Run 8 | .880 | 212 | 234 | 400 |

Figure 1:
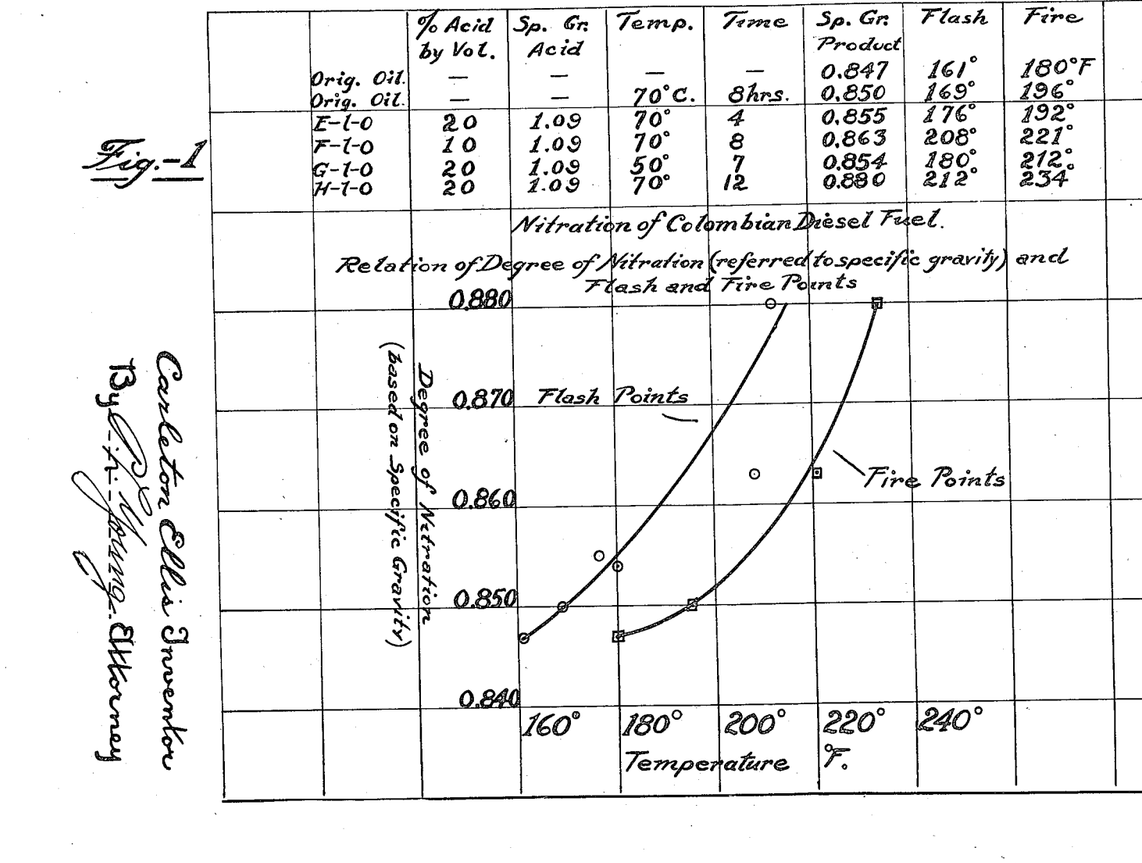

The above data indicate that both the flash point and fire point increase with the degree of nitration. The increase in flash and fire points with increase in specific gravity of the fuel are represented graphically in Fig. 1.

*Example 6.*—Diesel fuel from a Pennsylvania crude petroleum was treated with nitric acid at atmospheric temperature for 8 hours. In each instance 250 volumes of oil and 50 volumes of nitrating agent were employed. The specific gravity of the nitrating agent varied, in the different runs, from 1.09 to 1.42. The results obtained are given in the following table.

| Run | Specific gravity of acid | Color of product | Specific gravity of product | Percent sludge | Hot-plate behavior |
|---|---|---|---|---|---|
| Untreated fuel | | Colorless | 0.825 | | Did not ignite at 550° C. |
| 9 | 1.09 | do | .825 | | Do. |
| 10 | 1.15 | Light yellow | .825 | | Do. |
| 11 | 1.20 | do | .826 | | Do. |
| 12 | 1.30 | Yellow | .827 | <1 | Do. |
| 13 | 1.37 | Orange-yellow | .835 | 1 | Ignites at 400° C. |
| 14 | 1.42 | Orange | .839 | 4 | Ignites at 360° C. |

Figure 3:
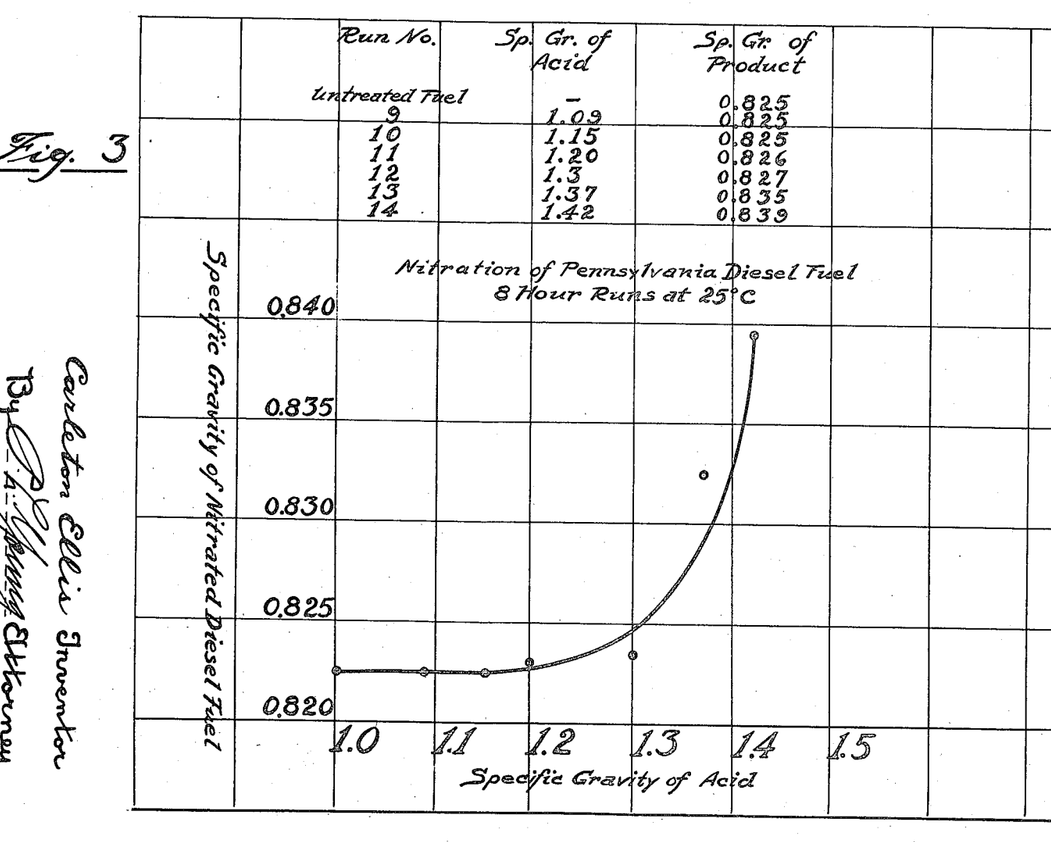
Fig. 3 represents the increase in degree of nitration, as indicated by the specific gravity of the oil, when various concentrations of nitric acid are employed in the nitration of Diesel fuel.

The relation between the specific gravity of the nitrated fuel and the specific gravity of the acid employed are shown in Fig. 3.

*Example 7.*—To 250 volumes of Colombian Diesel fuel were added 50 volumes of an aqueous solution containing 2.594 moles of sodium nitrate and 2.79 moles of sulphuric acid per liter of solution. (Assuming all the sodium nitrate to be converted into nitric acid by the sulphuric acid, the concentration of nitric acid is very close to that of a solution of nitric acid of specific gravity 1.09.) The mixture was agitated at a temperature of 70° C. for 2 hours. Only about 1 per cent of sludge was obtained while the specific gravity of the fuel increased from 0.847 to 0.864. Based on the increase in specific gravity the degree of nitration was about the same as that secured by treating the fuel for 8 hours at 70° C. with nitric acid of specific gravity 1.09.

*Example 8.*—Acid sludge obtained in the sulphuric acid refining of water white was diluted with an equal volume of water. The aqueous layer, sp. gr. 1.24, was employed in the following manner in the nitration of Colombian Diesel fuel. Sodium nitrate was added to the aqueous layer in the proportion of 2.594 moles per liter. Fifty volumes of the resulting solution were agitated with 250 volumes of Colombian Diesel fuel at 70° C. for 8 hours. The oil product, after washing, drying and filtering through sand, had a specific gravity 0.864 as compared with 0.847 for the untreated fuel.

*Example 9.*—Colombian Diesel fuel was heated to 70° C. and, while kept at this temperature, a stream of dry oxides of nitrogen, diluted with air, was passed through the liquid for 5 hours. Very little sludge was formed and the specific gravity of the oil increased from 0.847 to 0.862. In this instance the oxides of nitrogen were obtained by the action of nitric acid (1 volume of concentrated acid and 1 volume of water) on copper.

*Example 10.*—Nitration is effected by conducting a stream of oxides of nitrogen, mixed with air, into Diesel fuel kept at atmospheric temperature. In this case, the oxides of nitrogen were generated for the purpose by the action of sulphuric acid on sodium nitrite.

*Example 11.*—As shown in Example 5, the flash and fire points of an untreated Diesel fuel are 161° F. and 180° F., respectively. When 5 per cent by volume of nitroethane (boiling at 238–239° F.) is added to this fuel the flash and fire points of the blended fuel were found to be 97° F. and 111° F., respectively.

*Example 12.*—Nitrated Colombian Diesel fuels containing an auxiliary primer were prepared by adding 5 per cent by volume of nitroethane or of 2-methyl-2-nitropropane-1,3-dinitrate (as made according to Example 20) to the fuel made according to Run 7 in Example 4. The flash and fire points of these fuels were found to be as follows:

| Fuel | Flash point | Fire point |
|---|---|---|
| | °F. | °F. |
| Run 7 | 176 | 192 |
| Run 7+5% nitroethane | 133 | 140 |
| Run 7+5% nitrodinitrate | 172 | 180 |

Figure 2:
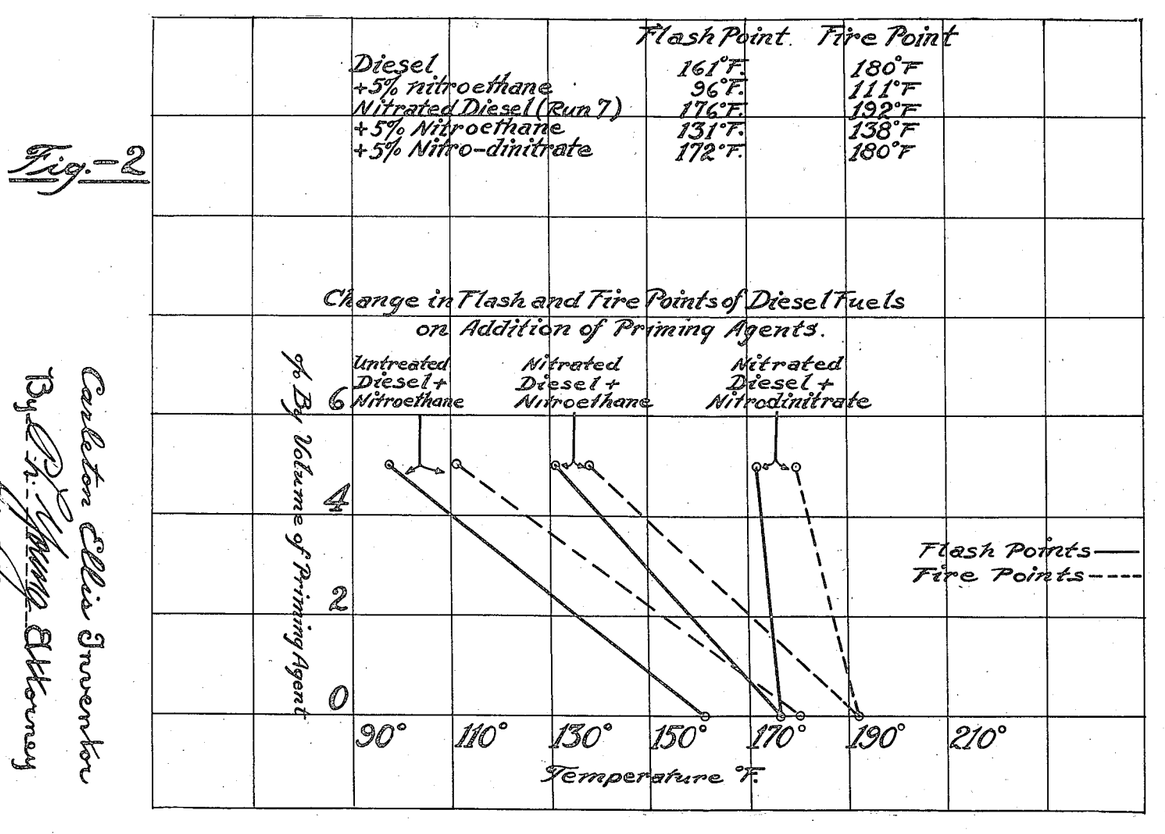
Fig. 2 shows the decrease in flash and fire points of untreated Diesel fuel due to the addition of nitroethane, and the decrease in these same properties of a nitrated fuel on the addition of nitroethane or 2-methyl-2-nitropropane-1,3-dinitrate.

The above data, and also that given in the preceding example, were used to plot the curves shown in Fig. 2.

*Example 13.*—The lowering of the fire and flash points of a Pennsylvania Diesel fuel due to the addition of 5 per cent by volume of ethyl nitrate (boiling 188°–190° F.) is given in the following table.

| Fuel | Flash point | Fire point |
|---|---|---|
| | °F. | °F. |
| Penn. Diesel | 274 | 299 |
| Penn. Diesel+5% ethyl nitrate | 115 | 296 |

*Example 14.*—The pour points of some of the fuels described in Example 2 were found to be as follows:

| Product | Sp. gr. | Pour point |
|---|---|---|
| | | °C. |
| Untreated fuel | 0.927 | −10 |
| Run 2 | 0.938 | −5 |
| Run 3 | 0.950 | −3 |

*Example 15.*—The pour points of the fuels described in Example 4 are tabulated below:

| Product | Sp. gr. | Pour point |
|---|---|---|
| | | °C. |
| Untreated fuel | 0.847 | −42 |
| Run 6 | 0.854 | −39 |
| Run 5 | 0.863 | −35 |
| Run 7 | 0.880 | −33 |

*Example 16.*—One hundred parts of hard white paraffin wax were treated at 100° C. for 25 hours with concentrated nitric acid and aluminum nitrate. Forty-three parts of acid were initially added, two equal portions (of 43 parts each) of acid were added during the course of nitration, one at the end of 7 hours and one at the end of 14.5 hours, and a third portion of 21.5 parts of acid was added at the end of 22.5 hours. One hundred and twenty-two parts of aluminum nitrate, $Al(NO_3)_3 \cdot 9H_2O$, were employed as the catalyst. The product, after removal of the acid layer and washing with water, was a yellow-colored, soft, low-melting solid. This product may be added to Diesel fuel, for example, in proportions of 2%, 3%, or 5% by weight, to decrease the ignition temperature of the fuel.

*Example 17.*—A portion of the product from Example 16 was extracted at room temperature with acetone, using 41 parts of nitrated paraffin wax and 40 parts of acetone. In this instance extraction yielded 29 parts of light yellow-colored acetone-soluble material, and about 12 parts of almost white acetone-insoluble material. Addition of 5% by weight of the acetone-soluble portion to Diesel fuel effected a substantial lowering of the ignition temperature of the fuel as indicated by the hot-plate test.

*Example 18.*—To 10 parts of nitrated wax as prepared in Example 16 were added 100 parts of ethyl alcohol. The mixture was chilled to 0° C., and the undissolved portion was removed by filtration. The solvent was removed by evaporation from the yellow alcoholic solution of nitrated bodies. The extract so obtained, amounting to 6.4 parts by weight, was a deep yellow colored, viscous oil which ignited more readily on a hot plate than the residue from the extraction step.

*Example 19.*—Two volumes of nitrated Diesel fuel (Run 8, Example 4) were agitated with 1 volume of aniline. After allowing the mixture to separate, the oil and aniline layers were separated. The aniline layer was washed with dilute hydrochloric acid and then with water (to remove aniline and acid, respectively) and the product obtained was a dark red, viscous, oily material which ignited spontaneously on a hot plate. The extracted Diesel fuel was washed also with dilute acid and water (to remove aniline and acid, respectively) and when tested on a hot plate failed to ignite, although the original nitrated fuel ignited easily under the same conditions.

*Example 20.*—Formalin (equivalent to 2 moles of formaldehyde) containing a trace of dissolved potassium hydroxide was added to nitroethane (1 mole). The resulting clear solution was heated for a short time at 50°–60° C., to complete reaction between the aldehyde and nitroethane, and then evaporated to dryness. The crude, solid nitro-diol(2-methyl-2-nitro-1,3-propanediol) was nitrated at 0°–5° C. with a nitrating mixture consisting of 3 parts of fuming nitric acid and 5 parts of concentrated sulphuric acid. A heavy, yellow oil was formed which was washed with water (to remove any free acid) and dried. This oil, although it ignited spontaneously when dropped on a hot-plate, did not explode when struck or when fired in a rifle cap.

*Example 21.*—The oily nitrated product as prepared in Example 20 may be employed as an ignition temperature depressant for Diesel fuel when added in ratio of 1 part by volume to 36 parts by volume of the fuel.

*Example 22.*—The oily nitrated product as prepared in Example 20 may be employed as an auxiliary ignition temperature depressant when added to nitrated Diesel fuel in the proportion of 1 part by volume to 16 parts by volume of the fuel.

*Example 23.*—A portion of the nitrated fuel, as prepared in Example 9, was stored in a closed container for 12 days. At the end of this period a small quantity of black deposit had formed. This was removed by filtration and the fuel stored for 5 hours at 80–85° C. and then 7 hours at 55° C. This aging of the fuel yielded only a very small proportion of dark colored scum. Removal of this by filtration and further aging of the oil for 24 hours at 45–50° C. failed to produce any additional dark colored deposit.

*Example 24.*—Four volumes of polymerized isobutylene (consisting principally of the trimeric and higher polymers) were treated, at 70° C., for 8 hours with 1 volume of nitric acid (specific gravity 1.20). No sludge was formed during nitration. This treatment increased the specific gravity of the fuel from 0.761 to 0.864 and lowered its ignition temperature from 660° F. to 395° F. Addition of 1 per cent by volume of the nitrated product to Colombian and Pennsylvania Diesel fuels lowered their ignition temperatures by 8° F. and 12° F., respectively.

*Example 25.*—Pennsylvania Diesel fuel was agitated for 8 hours at room temperature with 20 per cent its volume of nitric acid (specific gravity 1.42). About 2 per cent of sludge was formed. After separation of the nitrated oil layer it was washed with water, and then treated with solid magnesium carbonate to remove acidic bodies. The nitrated product possessed a cetane number of 84 (determined by engine test) as compared with 62 cetane number for the untreated fuel.

*Example 26.*—To 5 volumes of Colombian Diesel oil was added 1 volume of nitric acid (specific gravity 1.09) and the mixture was stirred for 11 hours at 70° C. A small amount of sludge (1%) was formed during nitration and the specific gravity of the oil changed from 0.850 to 0.870. The nitrated product possessed a cetane number (determined by engine tests) of 67 as compared to 44 for the untreated oil.

*Example 27.*—Twenty volumes of Colombian Diesel oil (specific gravity 0.850) were treated at 70° C. with 1 volume of nitrating mixture consisting of acid-sludge and sodium nitrate (see Example 8) for 8 hours. The specific gravity of the product was 0.860. The nitrated oil possessed a cetane number of 54 as compared to 44 for the untreated fuel.

*Example 28.*—Nitrogen determinations were made on the nitrated Colombian fuels prepared in Examples 26 and 27. The increases in specific gravity, percentage of nitrogen, and cetane numbers are tabulated below:

| Fuel | Specific gravity | Cetane number | Percent nitrogen |
| --- | --- | --- | --- |
| Untreated fuel | 0.850 | 44 | 0.008 |
| Example 27 | 0.860 | 54 | 0.066 |
| Example 26 | 0.870 | 67 | 0.42 |

*Example 29.*—One volume of the product from Example 26, possessing a cetane number of 67, was blended with 1 volume of untreated Colombian oil (cetane number of 44) to give a fuel having a cetane number of 61. Also 1 volume of the product from Example 26 was blended with 3 volumes of untreated Colombian oil to yield a fuel possessing a cetane number of 48.5.

*Example 30.*—Twenty volumes of Pennsylvania Diesel fuel and 1 volume of nitric acid (specific gravity 1.35) were stirred at atmospheric temperature for 12 hours. No sludge was formed and the final product was orange colored. In this instance the specific gravity of the untreated fuel was 0.825 and that of the nitrated fuel was 0.827. The flash and fire points of the untreated oil were found to be 274° F. and 299° F., respectively. For the nitrated oil the fire and flash points were 277° F. and 299° F., respectively. The cetane number of the fuel was increased from 63 to 80 by the treatment with nitric acid. The nitrogen content of the nitrated fuel was 0.32 per cent.

*Example 31.*—Ten volumes of Pennsylvania Diesel fuel were agitated, at room temperature, for 12 hours with 1 volume of nitric acid (specific gravity 1.42). The nitrated fuel, orange in color and possessing a specific gravity of 0.842, was blended with varying amounts of untreated Pennsylvania Diesel fuel to give three blended fuels: (A) containing approximately 2 volumes of nitrated fuel and 1 volume of untreated fuel, (B) consisting of approximately 1 volume of nitrated fuel and 1 volume of untreated fuel, and (C) made by adding 1 volume of blend (B) to 1 volume of untreated fuel. The cetane numbers of the various blends were found to be as follows: (A) 86; (B) 82.5; (C) 72. The cetane number of the untreated Pennsylvania oil was 63.

*Example 32.*—Several mixed fuels were prepared by blending Blend A from Example 31 with an untreated Colombian Diesel oil. The cetane numbers are given below:

| Fuel | Cetane number |
|---|---|
| Colombian Diesel oil (100%) | 47 |
| Colombian oil (80%)+blend A (20%) | 57 |
| Colombian oil (60%)+blend A (40%) | 63 |
| Colombian oil (40%)+blend A (60%) | 68 |
| Colombian oil (20%)+blend A (80%) | 76 |
| Blend A (100%) | 86 |

*Example 33.*—The increase in cetane number with increase in nitrogen content for the blended fuels described in Example 31 is given below:

| Fuel | Cetane number | Percent nitrogen |
|---|---|---|
| Pennsylvania Diesel | 63 | <0.001 |
| Blend C | 72 | *.08 |
| Blend B | 82.5 | .17 |
| Blend A | 86 | .26 |

* Calculated.

*Example 34.*—A Colombian Diesel fuel was repeatedly washed with portions of concentrated aqueous sodium hydroxide solution until the oil was substantially free of phenolic bodies. The presence of such bodies was tested for in the following manner: A small portion of the oil was withdrawn and shaken with a few cubic centimeters of aqueous sodium hydroxide solution. To the alkaline solution was added a few cubic centimeters of toluidine diazonium chloride solution, prepared from toluidine, hydrochloric acid, and sodium nitrite. The development of a red color was taken as an indication of the presence of phenolic compounds.

*Example 35.*—The substantially phenol-free Diesel fuel, prepared in Example 34, was nitrated according to Run 7, Example 4, except that the heating time was extended to 5 hours. The quantity of sludge obtained was about 0.25 per cent, as compared with 1 per cent for Run 7, Example 4.

From the foregoing it will be seen that my invention contemplates the process of treating petroleum oil, of the usual specific gravity and of recognized boiling range of fuels employed in Diesel engines, with nitrating agents including nitric acid, nitric-sulphuric acid mixtures, oxides of nitrogen, and the like. In the preferred method, treatment of the fuel is accompanied by a simultaneous lowering of temperature of ignition and increase of flash and fire points of the fuel. My invention involves the use of nitrating agents diluted with water to the approximate sludge minimum-point, i. e., nitrating agents yielding the minimum quantity of sludge when employed in the treatment of Diesel fuels thereby producing fuels of lower ignition temperatures. It also involves the treatment of petroleum fractions heavier than Diesel fuels with such nitrating agents, separation of the nitro products formed thereby from the non-nitrated petroleum hydrocarbons, and adding these nitro products to Diesel fuels in proportions sufficient to effect ignition temperature lowering.

In this specification the term ignition temperature is employed to denote the temperature of a hot plate, electrically heated, which will effect spontaneous ignition or inflammation (not merely evaporation) of the Diesel fuel when the latter is dropped on it.

It will be noted that the methods of nitration herein described are applicable to Diesel fuels obtained from several sources. Such methods may be applied also to many other types of Diesel fuels including hydrogenated fuels and the like. The optimum conditions of nitration, e. g., the concentration of the nitrating agent or agents, the proportions used, temperatures employed, or duration of treatment, will depend upon the chemical and physical characteristics of the fuel at hand.

It is important to recognize that the fuel of the present invention should not be confused with gasoline fuels as customarily used in automobile engines of the regulation spark ignition four cycle type. The new fuel is largely or wholly heavier than gasoline and is not readily ignited like gasoline by approach of flame. Diesel fuels are substantially non-volatile hydrocarbon oils generally boiling within the range of about 300° to 600° F., and usually exhibiting a specific gravity of about 0.80 to 0.90 or higher. On the other hand, ordinary gasoline boils from about 90° to 400° F., with a specific gravity of approximately 0.70 to 0.74. Again, the flash point of Diesel fuel ordinarily should not be lower than 150° F., or thereabout. On the other hand the flash point of commercial gasoline is quite low, being around 15° F. and even lower. Furthermore it is not an object so to lower the ignition properties as to thrust upon the new fuel the fire hazard commonly associated with gasoline, but rather to lower, in moderate degree the temperature of ignition under Diesel compression conditions and simultaneously increase the security from fire hazard (by increasing the flash and fire points) characteristic of the Diesel engine and for which its use in airplane propulsion is advocated.

My invention also provides a step in the operation of Diesel engines exposed to rapid variation in atmospheric pressure which consists in altering, in accordance with the pressure fluctuation, the proportion of catalyst (ignition temperature depressant) of temperature ignition admitted to the combustion chamber. It should be noted that for aviation purposes this proportion roughly speaking may be regarded as in inverse ratio, that is, the lower the atmospheric density the greater the proportion of catalyst or temperature ignition depressant admitted.

Substances included in the term nitro compounds are not only those in which a nitro, or $NO_2$, group is infixed or implanted in the hydrocarbon molecule, and which are often produced by the action of nitric acid or a mixture of nitric and sulphuric acids on paraffinic or cyclic hydrocarbons, but also such nitrogen containing compounds as nitrosites and nitrosates. The former type (nitrosites) are the compounds formed by the interaction of nitrogen trioxide and olefins, while the latter (nitrosates) are the results of the reaction between olefins and nitrogen tetroxide. The olefins may be either acyclic or cyclic. In some instances nitric acid reacts directly with certain types of unsaturated hydrocarbons forming addition products of the nitro type. All such compounds, containing these various nitrogen-oxygen groupings, when present in the fuel may serve to depress its ignition temperature sufficiently to allow its being employed in Diesel engines.

What I claim is:

A method of improving the ignition quality of a Diesel fuel for more efficient combustion in a compression-ignition engine, which comprises mixing a petroleum distillate Diesel oil having a higher boiling range than gasoline and a cetane number higher than about 44 with dilute nitric acid of specific gravity from about 1.09 to about 1.37 in proportions ranging from about equal volumes of the Diesel oil and acid to 5 volumes of the Diesel oil to 1 volume of the acid, maintaining the resulting mixture at a temperature below 100° C. for a period adequate to form oil-soluble nitrated derivatives from some of the oil components without substantial oxidation of the oil to acidic bodies and to form less than about 1% of sludge impurities, said nitration being limited to materially increase the nitrogen content of the oil by about 0.06 to 0.42% through the formation of said nitrated derivatives, and thereafter recovering the treated oil containing said nitrated derivatives in solution by separation of any excess spent nitrating agent therefrom.

CARLETON ELLIS.